United States Patent
Hsu

(10) Patent No.: US 7,144,144 B2
(45) Date of Patent: Dec. 5, 2006

(54) LIGHT RELEASE RING FOR VEHICLE LIGHTS

(75) Inventor: Shu-Sheng Hsu, Fontana, CA (US)

(73) Assignee: Maxzone Vehicle Lighting Corp., Fontana, CA (US)

( * ) Notice: Subject to any disclaimer, the term of this patent is extended or adjusted under 35 U.S.C. 154(b) by 66 days.

(21) Appl. No.: 10/951,706

(22) Filed: Sep. 29, 2004

(65) Prior Publication Data

US 2006/0067086 A1   Mar. 30, 2006

(51) Int. Cl.
*B60Q 3/04* (2006.01)
(52) U.S. Cl. .................. 362/543; 362/544; 362/517; 362/520; 362/245
(58) Field of Classification Search ............... 362/517, 362/520, 240, 252, 543–545, 243, 245, 247
See application file for complete search history.

(56) References Cited

U.S. PATENT DOCUMENTS

| 2,668,902 | A * | 2/1954 | Fisher | 362/487 |
| 6,619,829 | B1 * | 9/2003 | Chen | 362/544 |
| 6,641,295 | B1 * | 11/2003 | Hu | 362/545 |

* cited by examiner

*Primary Examiner*—Stephen F Husar
(74) *Attorney, Agent, or Firm*—Rosenberg, Klein & Lee

(57) ABSTRACT

A vehicle light includes a reflector with a concave reflection surface and a main lamp is connected to a center of the concave reflection surface. A reflection member is connected to the reflector and includes an annular groove with which a light release ring is engaged. A plurality of sub-lamps are connected to the reflection member and light beams emitted by the sub-lamps are toward directly to a reflection inner surface of the light release ring. A cover plate is engaged with the reflection member and encloses the light release ring.

6 Claims, 7 Drawing Sheets

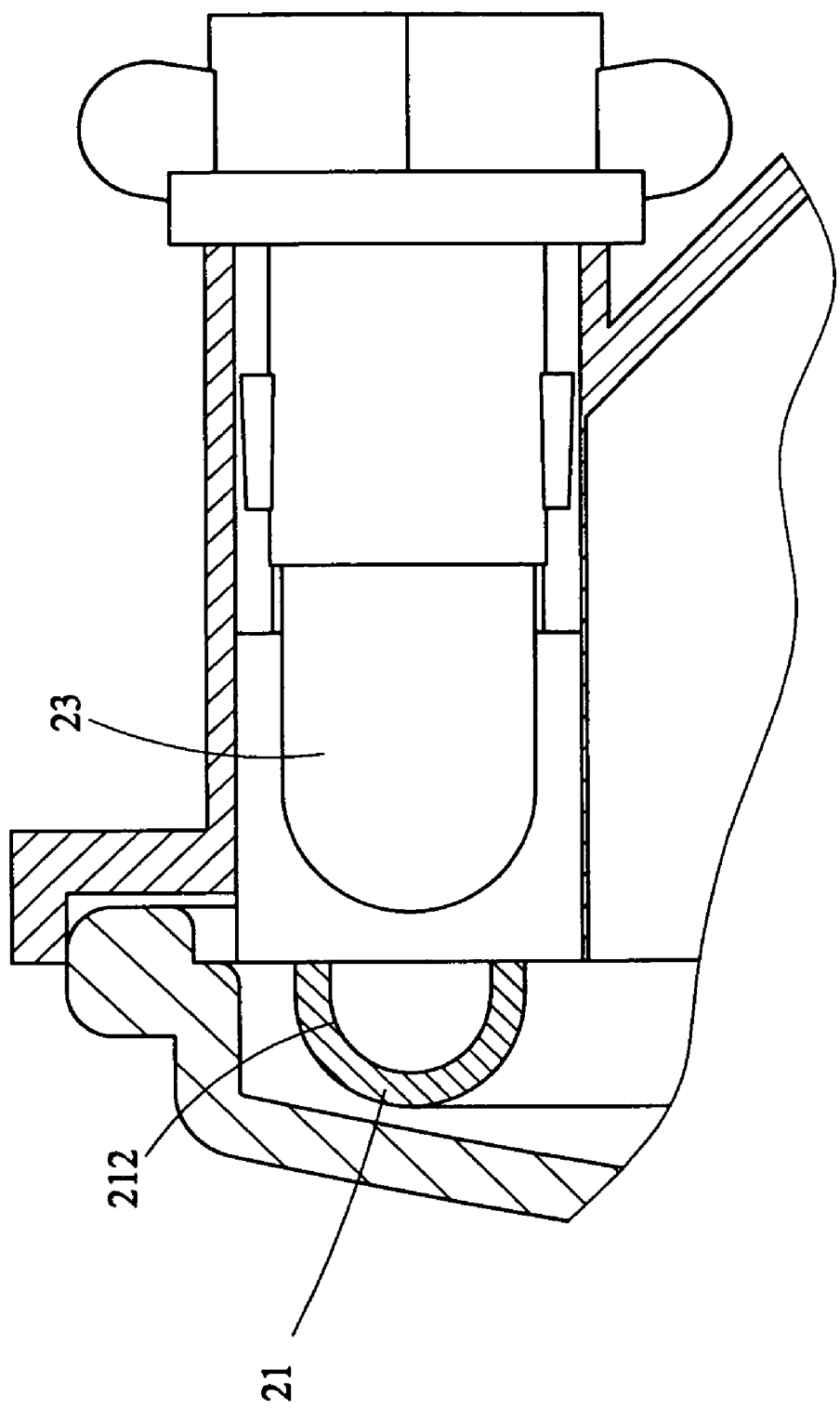

LIGHT RELEASE RING FOR VEHICLE LIGHTS

FIELD OF THE INVENTION

The present invention relates to a vehicle light having a light release ring and sub-lamps emit light beam to the light release ring to provide a visible light ring independent from the main lamp.

BACKGROUND OF THE INVENTION

A conventional light for vehicles generally includes a main lamp which is located at a focus position of the reflector so as to provide a light beam for illuminating the road in front of the drivers, and a sub-lamp which provide visible light when the main lamp is not in use. U.S. Pat. No. 6,107,916 discloses a signal lamp for vehicles and includes a light release ring made of optical fibers and the sub-lamp emits light toward the optical fibers which indirectly reflect the light beam. However, the optical fibers are expensive and the illumination from the optical fibers is not satisfactorily bright enough. Some lights for vehicles reflect the light beam via the reflector so that the light release ring can be seen. The sub-lamps usually can generate less light than the main lamp so that the light release ring cannot be seen clearly if the main lamp is operated.

The present invention intends to provide a vehicle light that includes several sub-lamps connected to a periphery of the reflector and emit light beam directly to the light release ring connected to the reflector so as to improve the inherent shortcomings of the conventional vehicle lights.

SUMMARY OF THE INVENTION

The present invention relates to a vehicle light which comprises a reflector with a concave reflection surface and a main lamp is connected to a center of the concave reflection surface. A reflection member is connected to the reflector and includes an annular groove. A plurality of sub-lamps are connected to the reflection member. A light release ring is engaged with the annular groove and has a reflection inner surface toward which the light beams emitted from the sub-lamps. A cover plate is engaged with the reflection member.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 3 is an enlarged cross sectional view to show the sub-lamp and the light release ring of the of the present invention;

DETAILED DESCRIPTION OF THE PREFERRED EMBODIMENT

Figure 1:
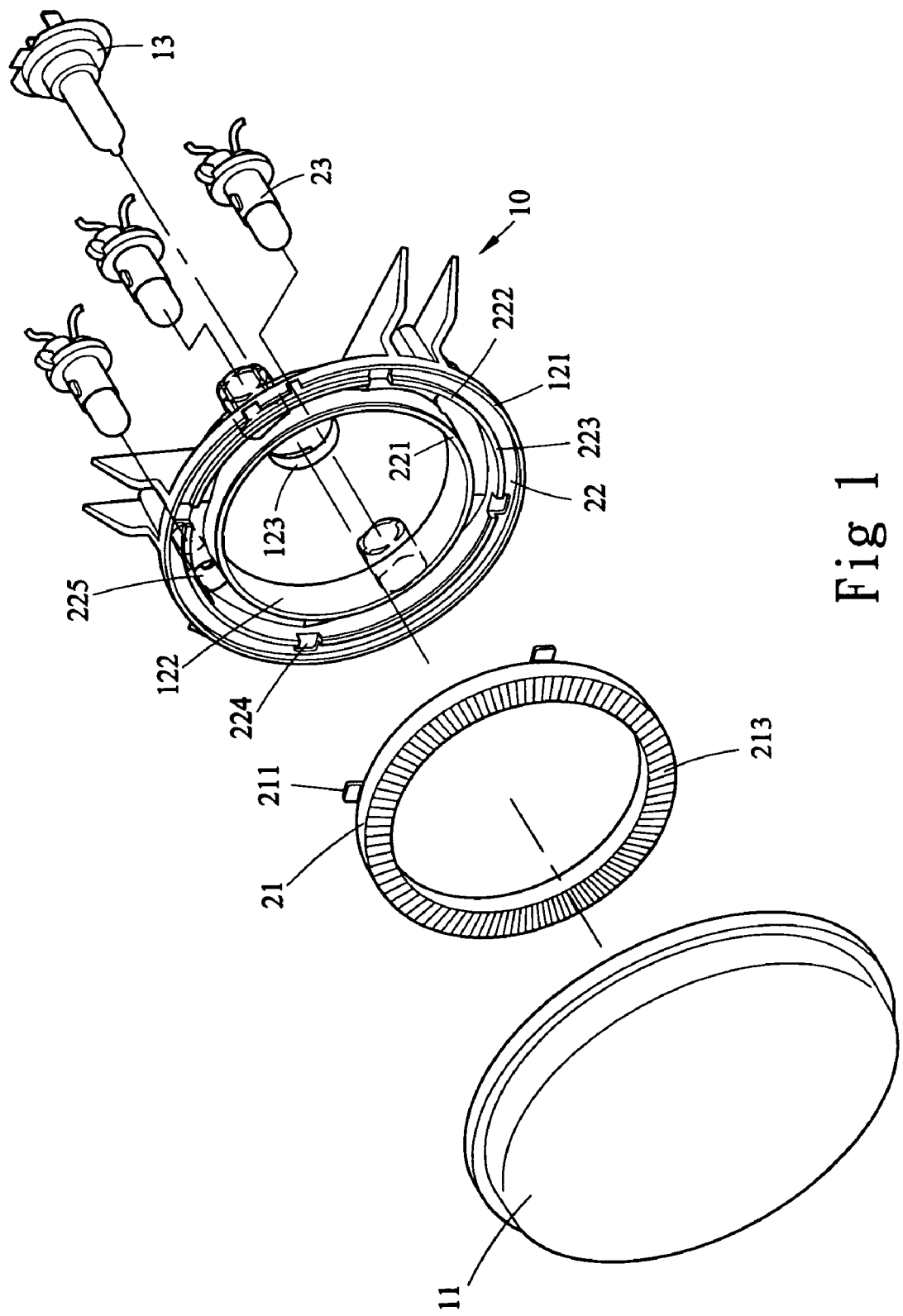
FIG. 1 is an exploded view to show the vehicle light of the present invention.
Figure 2:
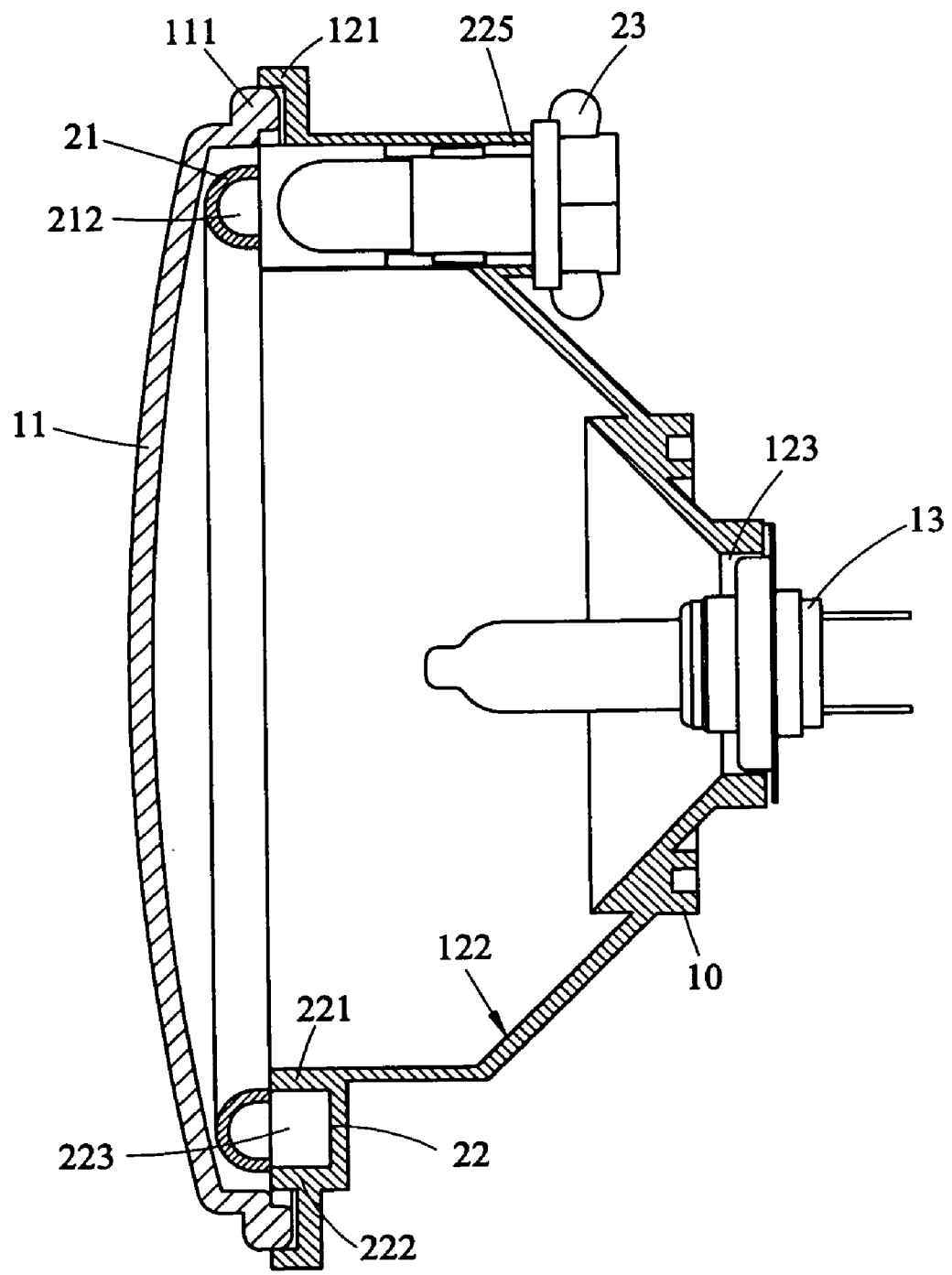
FIG. 2 is a side cross sectional view to show the vehicle light of the present invention.

Referring to FIGS. 1 to 3 and 5, the vehicle light of the present invention comprises a reflector 10 with a concave reflection surface 122 and a main lamp 13 is installed in the hole 123 defined in a center of the concave reflection surface 122. A reflection member 22 is connected to the reflector 10 and includes an inner reflection surface 221 and an outer reflection surface 222 as shown, and an annular groove 223 is defined between the inner and outer reflection surfaces 221, 222. A plurality of sub-lamps 23 are installed in the holes 225 defined in the reflection member 22. A light release ring 21 includes a reflection outer surface 213 and four lugs 211 which extend from an outer periphery thereof and are engaged with holes 224 defined in the reflection member 22. The light release ring 21 is positioned to be engaged with the annular groove 223 and has a reflection inner surface 212. The reflection inner surface 212 of the light release ring 21 is located to face the sub-lamps 23 such that the light beams emitted from the sub-lamps 23 are directed toward the reflection inner surface 212, and the inside of the annular groove 223 is a reflection surface to increase the illumination of the light release ring 21. A cover plate 11 is engaged with the reflection member 22 by engaging a lip 111 thereof with a positioning groove 121 in the reflector 10. The cover plate 11 encloses the light release ring 21 so that the illuminated light release ring 21 can be seen via the cover plate 11.

It is noted that there is no glue or foreign object between the light release ring 21 and the cover plate 11 so that the light release ring 21 can be clearly seen via the cover plate 11. Besides, the illumination of the light release ring 21 is not interrupted by the main lamp 13 so that the light release ring 21 is clearly visible even when the main lamp 13 is on.

Figure 4B:
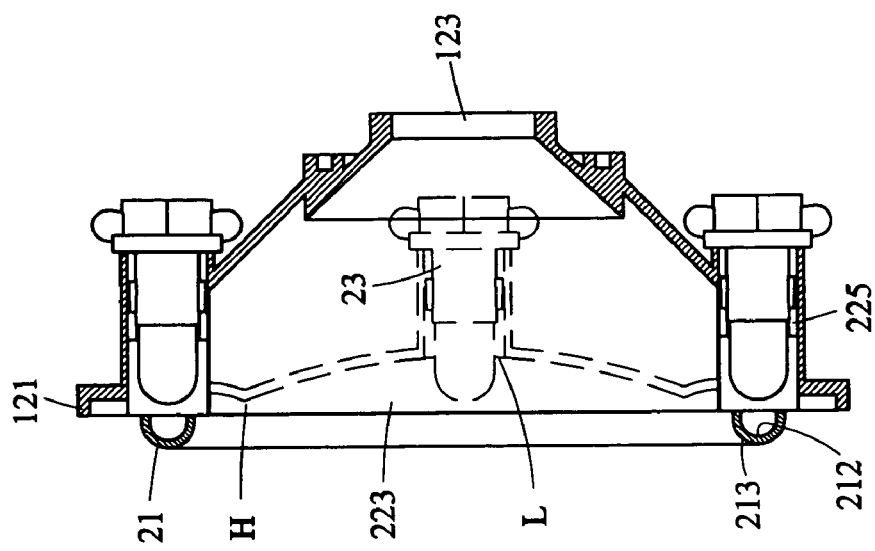
FIG. 4B shows a side view of the arrangement of the sub-lamps on the reflection member.
Figure 4A:
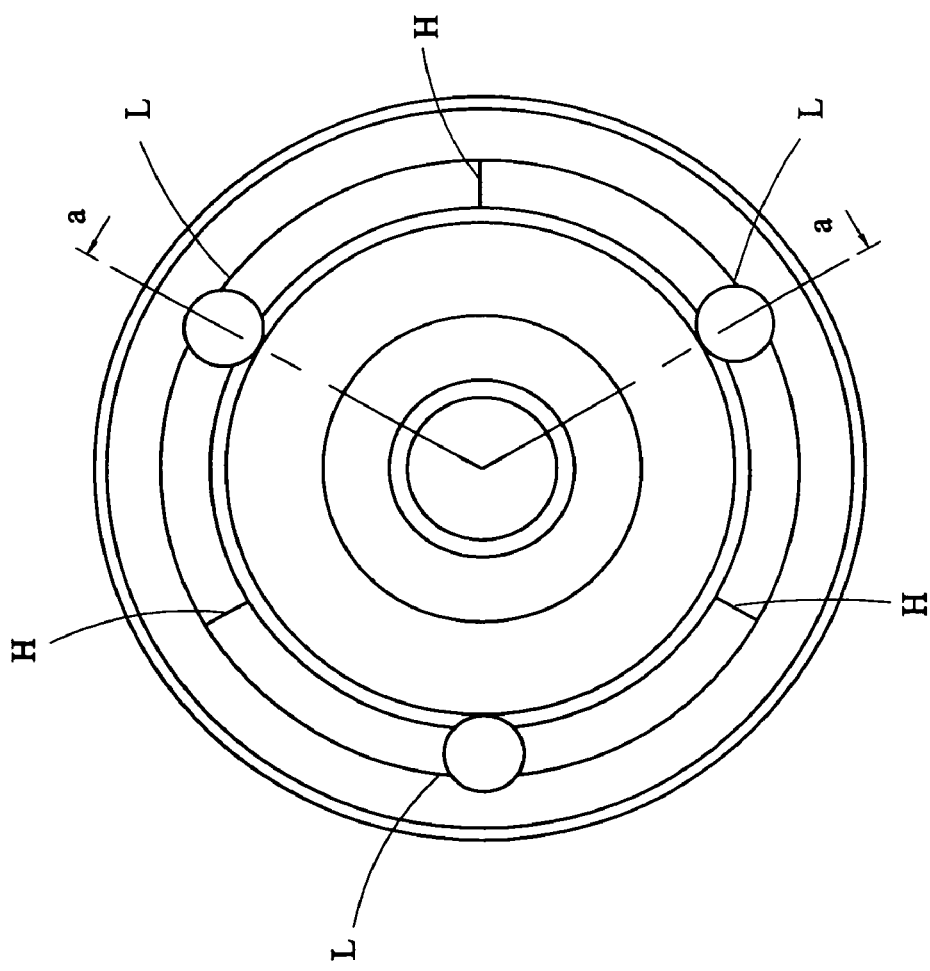
FIG. 4A shows the arrangement of the sub-lamps on the reflection member.
Figure 5:
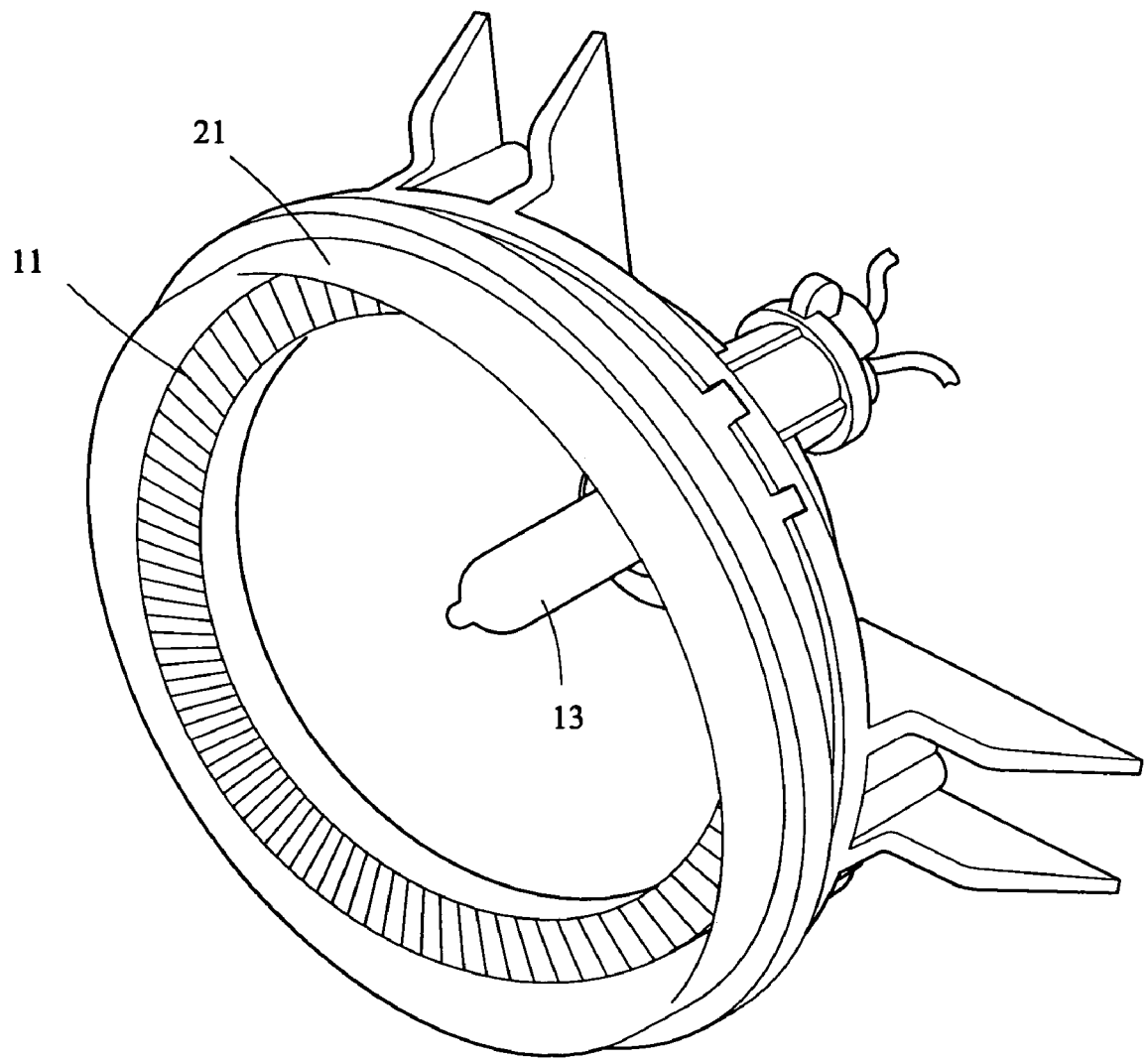
FIG. 5 is a perspective view of the vehicle light of the present invention.

As shown in FIGS. 4A and 4B, the reflection member 22 has a surface facing the light release ring 21 and the surface includes a plurality of recessed areas evenly located therealong and each recessed includes a lowest position "L" wherein one of the sub-lamps 23 is located, and two highest positions "H". Each highest position "H" is located at a middle of two adjacent lowest positions "L". The curvature of the recessed areas is designed such that the whole surface of the recessed area can be illuminated by the sub-lamp 23 and this ensures that the light release ring 21 evenly illuminates even at the highest positions "H" which are located far from the sub-lamps 23.

Figure 7:
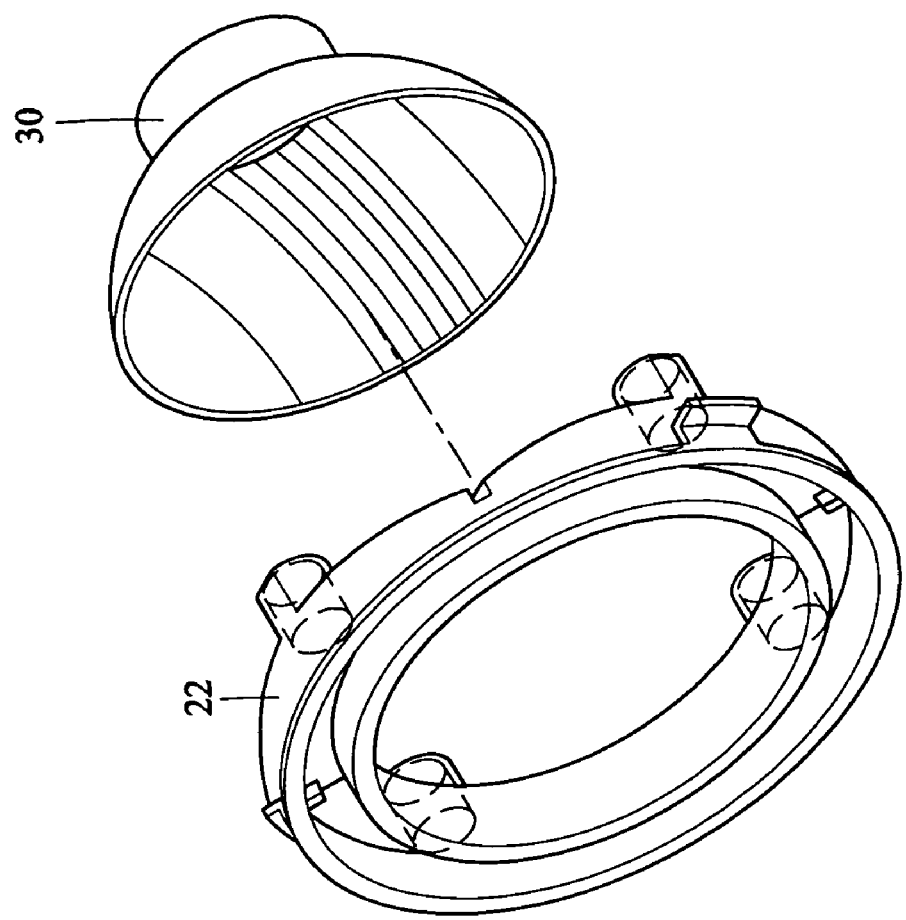
FIG. 7 is an exploded view of the vehicle light in FIG. 6.
Figure 6:
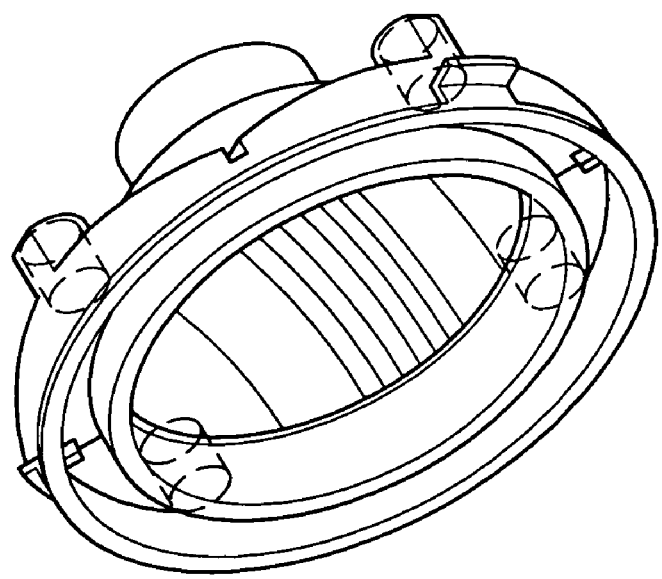
FIG. 6 is a perspective view of another embodiment of the vehicle light of the present invention.
Figure 9:
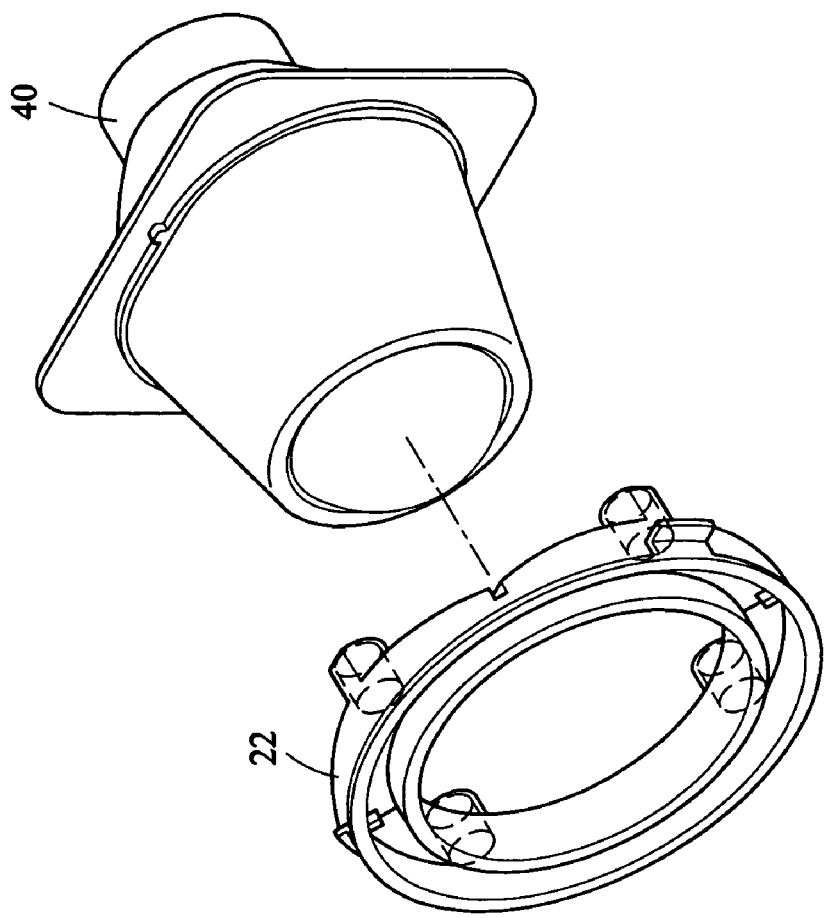
FIG. 9 is an exploded view of the vehicle light in FIG. 8.
Figure 8:
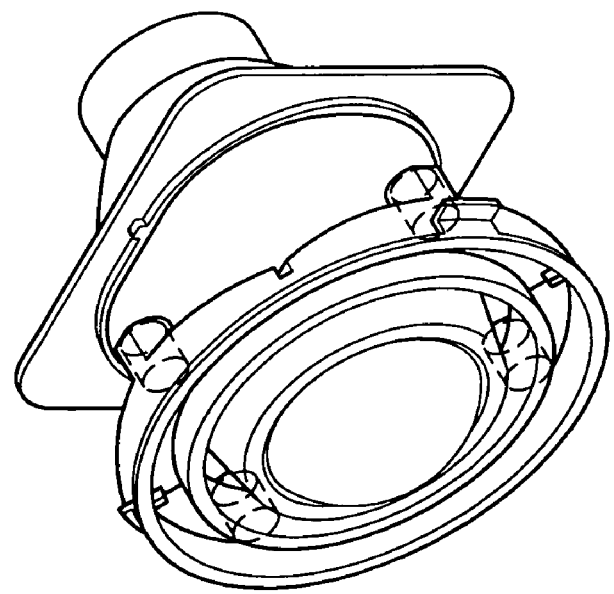
FIG. 8 is a perspective view of yet another embodiment of the vehicle light of the present invention.

FIGS. 6 and 7 shows that the reflector 30 and the reflection member 22 can be made in separate. FIGS. 8 and 9 show that the reflector 40 is an elongate member which extends through the reflection member 22.

While we have shown and described the embodiment in accordance with the present invention, it should be clear to those skilled in the art that further embodiments may be made without departing from the scope of the present invention.

What is claimed is:

1. A vehicle light comprising:
   a reflector with a concave reflection surface and a main lamp connected to a center of the concave reflection surface;
   a reflection member connected to the reflector and including an annular groove defined therein, a plurality of sub-lamps connected to the reflection member and disposed within respective holes formed in the annular groove, a light release ring engaged with the annular groove and having a reflection inner surface, and
   a cover plate engaged with the reflection member.

2. The vehicle light as claimed in claim 1, wherein the light release ring includes a plurality of lugs extending from an outer periphery thereof and the lugs are engaged with holes defined in the reflection member.

3. The vehicle light as claimed in claim 1, wherein the reflection inner surface of the light release ring is located to face the sub-lamps.

4. A vehicle light comprising:
   a reflector with a concave reflection surface and a main lamp connected to a center of the concave reflection surface;
   a reflection member connected to the reflector and including an annular groove defined therein, a plurality of sub-lamps connected to the reflection member, a light release ring engaged with the annular groove and having a reflection inner surface; and,
   a cover plate engaged with the reflection member;
   wherein the reflection member has a surface facing the light release ring and the surface includes a plurality of undulating areas extending therealong, and each undulating area including a lowest position wherein one of the sub-lamps is located, disposed between two highest positions.

5. The vehicle light as claimed in claim 4, wherein each highest position is located between two adjacent lowest positions.

6. A vehicle light comprising:
   a reflector with a concave reflection surface and a main lamp connected to a center of the concave reflection surface;
   a reflection member connected to the reflector and including an annular groove defined therein a plurality of sub-lamps connected to the reflection member, a light release ring engaged with the annular groove and having a reflection inner surface; and,
   a cover plate engaged with the reflection member, wherein the cover plate encloses the light release ring.

* * * * *